Aug. 5, 1952     A. B. REID     2,605,788
CUTTING CHAIN
Filed Oct. 20, 1949
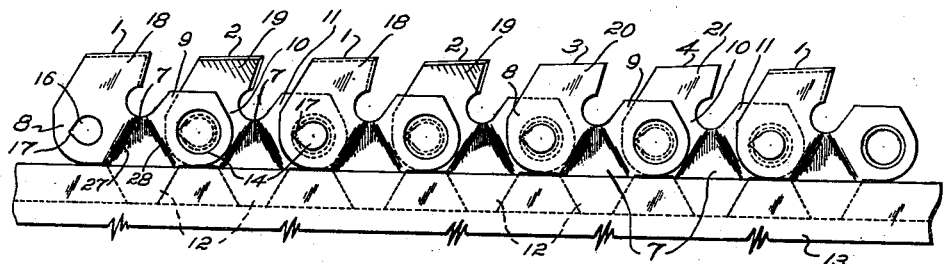
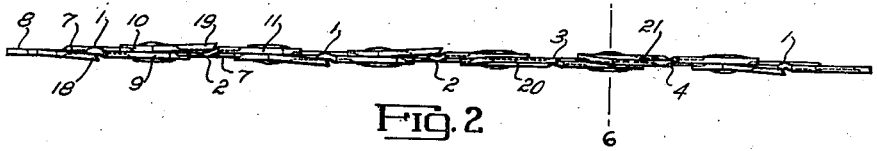
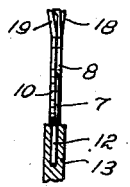
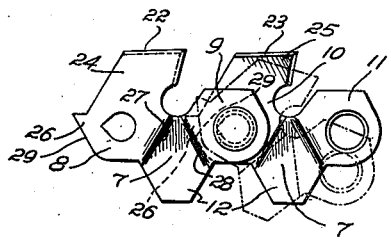
Anthony B. Reid
INVENTOR.
BY Alex. E. MacRae
Attorney.

Patented Aug. 5, 1952

2,605,788

UNITED STATES PATENT OFFICE 2,605,788

CUTTING CHAIN

Anthony Brendan Reid, Lansdowne, Ontario, Canada

Application October 20, 1949, Serial No. 122,397

5 Claims. (Cl. 143—135)

This invention relates to chain saws, and more particularly to the cutting chain structure thereof.

One of the chief disadvantages of presently available chain saws is the relatively wide kerf produced in the sawing operation, such wide kerf being an inherent result of the cutting chain structure. While it is obviously desirable to provide a saw which will take out a minimum of wood in the sawing operation in order to speed up the sawing operation, conserve wood and employ as little driving power as possible, the minimum width of kerf produced by present day cutting chains is substantially three-eighths of an inch. Moreover, such saws usually consist of a relatively large number of different parts and manufacturing and maintenance costs are high.

It is an object of this invention to provide a cutting chain of simple and inexpensive structure and having a relatively narrow overall thickness whereby the sawing operation is conducted with greater speed, less power consumption, and less wastage of wood.

To this end, the invention contemplates the provision of a cutting chain comprising a plurality of pivotally connected links, each link having a body portion and leading and trailing portions lying in a common plane laterally offset from the plane of the body portion, and a tooth carried by at least the trailing portion of each link.

The invention will be described with reference to the accompanying drawing, in which, Figure 1 is a side elevation of a portion of a cutting chain in accordance with the invention, Figure 2 is a plan view of the chain shown in Figure 1, Figure 3 is an end elevation of the chain shown in Figure 1, Figure 4 is a plan view of a slightly modified form of cutting chain, Figure 5 is a side elevation of a modified form of links, and Figure 6 is a sectional end elevation of a rivet connection for the links.

Referring to Figures 1, 2 and 3, the cutting chain shown comprises four different links, 1, 2, 3, 4, arranged in a plurality of successive series of six links each, the consecutive order of links in each series being 1, 2, 1, 2, 3, 4.

All links are formed from metal plate of uniform thickness throughout and each possesses structural characteristics common to those in the other links of the series, and including body portions 7 lying in a common vertical plane. Alternate links 1 and 3 have a trailing portion 8 and a leading portion 9 both also lying in a common vertical plane but laterally offset in one direction from the first plane. The other alternate links 2 and 4 have a trailing portion 10 and a leading portion 11 both also lying in a common vertical plane but laterally offset in the opposite direction from the first plane. The degree of offset in each case is preferably one-half the thickness of the metal plate whereby the overall width of the chain is not greater than twice the thickness of the metal plate from which the links are formed. A part 12 of each body portion 7 extends downwardly, as shown, to provide a plurality of spaced guide and sprocket engaging members. As shown in Figure 1 and 3, the parts 12 travel in the usual grooved chain guide 13.

The links are assembled to form a chain with the leading portion of each link overlapping the trailing portion of the next succeeding link, such overlapped portions being pivotally connected as by rivets 14. As shown, each link has a counterbored opening 15 to receive the head of the rivet and a flared opening 16 to enable the driven head of the rivet to be countersunk. It will be observed that the rivets are applied alternately from each side of the chain. In order to positively prevent the rivet from turning in the structure, it is proposed to provide a notch 17 in the wall opening 16 to receive a portion of the rivet when the latter is driven. Such a rivet structure prevents loosening of the rivet and resultant failure of the chain.

Since the overlapped portions are reversely offset half their thickness, the exposed side surfaces of the overlapped portions each lie in a vertical plane spaced outwardly from the adjacent surface of the body portion 7 a distance equal to half the thickness of such body portion, as clearly shown in Figure 3.

The trailing portion of each link carries an upwardly extending tooth structure, the leading portion of each link being free from a tooth structure in the modification shown. Link 1, offset portions of which are directed towards the right, has a cutter tooth 18 carried by its trailing portion 8. Link 2, the offset portions of which are directed towards the left, has a cutter tooth 19 carried by its trailing portion 10. Link 3, the offset portions of which are directed towards the right, has a raker tooth 20 carried by its trailing portion 8. Link 4, the offset portions of which are directed towards the left, has a raker tooth 21 carried by its trailing portion 10.

Cutters 18 have a right hand set and cutters 19 a left hand set, as shown, the angle of set varying in the usual manner with the type of wood and operating conditions. The angle of set has been somewhat exaggerated in the drawing for clarity of illustration. Raker teeth 20 and 21 may be inclined inwardly towards the plane of body portions 7 for more effective operation.

The arrangement of links may be varied widely within the scope of the invention. Figure 4, illustrates one modified arrangement, wherein the same links are employed but in different order. As shown, the consecutive order of links in each series of such modified arrangement is 1, 2, 3, 2, 1, 4.

It will be observed that but two basic link structures are employed, namely, that from which links 1 and 3 are formed and in which the offset portions are towards the right, and that from which links 2 and 4 are formed and in which the offset portions are towards the left. It will also be observed that the two basic links are identical in shape except that the respective offset portions are directed in reverse directions. Thus, the links may be produced by simple stamping operations, and the desired tooth structure subsequently formed thereon.

Figure 5 illustrates a somewhat modified form of link structure. Two connected links 22 and 23 are shown, similar to the links previously described and having similar body portions 7, respective trailing portions 8 and 10, and respective leading portions 9 and 11. The trailing portion of each link 22, 23 carries a respective tooth 24, 25. The trailing portion of each link also carries a rearwardly extending projection 26, which in normal or longitudinally aligned position of the links remains in overlapped relation with the leading portion of the adjacent link, but which, when one link swings out of alignment with the adjacent link (as when travelling around the usual chain-supporting sprockets), moves upwardly into the space between teeth 24 and 25, as shown in dotted lines in Figure 5. Such projection 26 acts as a means for loosening and cleaning out accumulations of sawdust between the teeth of the saw.

It will be observed that the body portion 7 of each link is conveniently of triangular shape, i. e., the offset portions of the link are pressed outwardly from the plane of the body portion along upwardly converging lines 27 and 28. It is proposed that the rear edge 29 of links 22, 23 which constitutes the rear edge of projection 26, be inclined to coincide substantially with line 28 of the body portion of the adjacent link. Thus, in the form shown in Figure 5, engagement of the upper portion of the edge 29, as extended by the projection 26, with the relatively projecting edge of such body portion, as defined by the line 28, will tend to prevent upward swinging movement of one link relative to the other and consequently facilitate handling and operation of the chain.

The chain described may be manufactured in a convenient and inexpensive manner. The links are associated with each other in such manner that the overall width of the chain is restricted to a minimum and the kerf cut by such a chain is substantially narrower than that resulting from use of heretofore proposed chains. Thus, a chain constructed in accordance with the invention will cut a kerf at least as narrow as three-sixteenths of an inch in width, with resulting considerable saving in wood and power.

What is claimed is:

1. A cutting chain for saws having a plurality of successive series of pivotally connected links, said links each being of unitary structure and having a body portion, a trailing portion and a leading portion, said body portions being arranged to lie in a common plane, the trailing and leading portions of each alternate link being arranged to lie in a common plane laterally offset in one direction from said first plane, the trailing and leading portions of each of the other alternate links being arranged to lie in a common plane laterally offset in the opposite direction from said first plane, the leading portion of each link lying in overlapping and laterally abutting relation with the trailing portion of the next succeeding link, said overlapped portions having a pivotal connection extending therethrough, and a tooth integrally carried by said trailing portion of each link.

2. A cutting chain for saws having a plurality of successive series of pivotally connected links, said links each being unitarily formed of metal of uniform thickness and having a body portion, a trailing portion, and a leading portion, said trailing and leading portions of each alternate link lying in a common plane and being laterally offset in one direction from the body portion, and the trailing and leading portions of each of the other links lying in a common plane and being laterally offset in the opposite direction from the body portion, the leading portion of each link lying in overlapping and laterally abutting relation with the trailing portion of the next succeeding link, said overlapped portions having a pivotal connection extending therethrough, and a tooth integrally carried by the trailing portion of each link.

3. A cutting chain for saws as defined in claim 2, wherein certain of said teeth constitute cutting teeth and certain others of said teeth constitute raker teeth.

4. A cutting chain for saws comprising a plurality of series of links, each said link being unitarily formed from metal plate and having a body portion, a trailing portion and a leading portion, the trailing and leading portions being laterally offset from the plane of the body portion, a tooth integrally carried by one of said offset portions, the leading portion of each link lying in overlapping abutting relation with the trailing portion of the next succeeding link, means pivotally connecting together said overlapping portions, the trailing portion of each link having a rearwardly extending projection, said projection having an upper edge normally lying in substantially the same plane as that of the upper edge of the body portion of the adjacent link but moving upwardly in relation to said upper edge of the body portion in response to rotative movement of one link with respect to the next succeeding link, the juncture between said trailing and leading portions and said body portion being along a pair of upwardly converging lines, said body portion having a substantially triangular configuration, and the rearward edge of said projection being inclined and substantially coinciding with one of said lines of the next succeeding link.

5. In a cutting chain for saws having a plurality of successive series of links, said links each having a flat body portion, the body portions of the links lying in a common plane, and flat leading and trailing portions lying in a common plane laterally offset from and parallel to the plane of the body portion, the leading portion of each link lying in overlapping laterally abutting relation with the trailing portion of the next succeeding link, said overlapped portions having a pivotal connection extending therethrough, at least one link of each series having a tooth carried by said trailing portion.

ANTHONY BRENDAN REID.

REFERENCES CITED

The following references are of record in the file of this patent:

UNITED STATES PATENTS

| Number | name | Date |
| --- | --- | --- |
| 1,363,171 | Sly | Dec. 21, 1920 |
| 1,634,644 | Bens | July 5, 1927 |
| 2,351,112 | Day | June 13, 1944 |
| 2,508,784 | Cox | May 23, 1950 |